US007821518B1

(12) United States Patent
Donham et al.

(10) Patent No.: US 7,821,518 B1
(45) Date of Patent: Oct. 26, 2010

(54) FAIRLY ARBITRATING BETWEEN CLIENTS

(75) Inventors: Christopher D. S. Donham, San Mateo, CA (US); John S. Montrym, Los Altos Hills, CA (US)

(73) Assignee: NVIDIA Corporation, Santa Clara, CA (US)

( * ) Notice: Subject to any disclaimer, the term of this patent is extended or adjusted under 35 U.S.C. 154(b) by 118 days.

(21) Appl. No.: 11/955,334

(22) Filed: Dec. 12, 2007

Related U.S. Application Data

(62) Division of application No. 10/931,447, filed on Sep. 1, 2004, now Pat. No. 7,417,637.

(51) Int. Cl.
*G06T 1/20* (2006.01)

(52) U.S. Cl. ....................... 345/506; 710/240; 345/541; 345/535

(58) Field of Classification Search ....................... None
See application file for complete search history.

(56) References Cited

U.S. PATENT DOCUMENTS

| | | | | |
|---|---|---|---|---|
| 5,450,542 | A | 9/1995 | Lehman et al. | |
| 5,553,276 | A * | 9/1996 | Dean | 713/500 |
| 6,397,343 | B1 * | 5/2002 | Williams et al. | 713/501 |
| 6,636,949 | B2 * | 10/2003 | Barroso et al. | 711/141 |
| 6,640,287 | B2 * | 10/2003 | Gharachorloo et al. | 711/141 |
| 7,076,681 | B2 * | 7/2006 | Bose et al. | 713/600 |
| 7,263,587 | B1 | 8/2007 | Yeh et al. | |
| 2003/0131271 | A1 * | 7/2003 | Chen et al. | 713/322 |
| 2004/0255086 | A1 * | 12/2004 | Sengdan | 711/150 |
| 2006/0094501 | A1 * | 5/2006 | O'Leary et al. | 463/30 |
| 2006/0115016 | A1 | 6/2006 | Chen et al. | |

OTHER PUBLICATIONS

Office Action. U.S. Appl. No. 11/955,335, Dated Mar. 13, 2009.
Eggers, et al. "Simultaneous Multithreading: A Platform for Next-Generation Processors," IEEE Micro, vol. 17, No. 5, pp. 12-19, Sep./Oct. 1997.

* cited by examiner

*Primary Examiner*—Kee M Tung
*Assistant Examiner*—David H Chu
(74) *Attorney, Agent, or Firm*—Patterson & Sheridan, LLP

(57) ABSTRACT

An apparatus and method for fairly arbitrating between clients with varying workloads. The clients are configured in a pipeline for processing graphics data. An arbitration unit selects requests from each of the clients to access a shared resource. Each client provides a signal to the arbitration unit for each clock cycle. The signal indicates whether the client is waiting for a response from the arbitration unit and whether the client is not blocked from outputting processed data to a downstream client. The signals from each client are integrated over several clock cycles to determine a servicing priority for each client. Arbitrating based on the servicing priorities improves performance of the pipeline by ensuring that each client is allocated access to the shared resource based on the aggregate processing load distribution.

14 Claims, 7 Drawing Sheets

FAIRLY ARBITRATING BETWEEN CLIENTS

CROSS-REFERENCE TO RELATED APPLICATIONS

This application is a divisional of U.S. patent application Ser. No. 10/931,447, filed Sep. 1, 2004.

FIELD OF THE INVENTION

One or more aspects of the invention generally relate to schemes for arbitrating between multiple clients, and more particularly to performing arbitration in a graphics processor.

BACKGROUND

Current graphics data processing includes systems and methods developed to perform specific operations on graphics data, e.g., linear interpolation, tessellation, rasterization, texture mapping, depth testing, etc. During the processing of the graphics data, conventional graphics processors read and write dedicated local memory, e.g., a frame buffer, to access texture maps and frame buffer data, e.g., a color buffer, a depth buffer, and a depth/stencil buffer. For some processing, the performance of the graphics processor is constrained by the maximum bandwidth available between the graphics processing sub-units and the frame buffer. Each graphics processing sub-unit which initiates read or write requests for accessing the frame buffer is considered a “client.”

Various arbitration schemes may be used to allocate the frame buffer bandwidth amongst the clients. For example, a first arbitration scheme arbitrates amongst the clients by giving the sub-unit with the greatest quantity of pending requests the highest priority. A second arbitration scheme arbitrates amongst the clients based on the age of the requests. Specifically, higher priority is given to requests with the greatest age, i.e., the request which was received first amongst the pending requests. Each of these schemes is prone to error, because the age or quantity of requests does not incorporate information about the latency hiding ability of a particular client. Furthermore, age is measured in absolute time, whereas the actual needs of a particular client may also depend on the rate at which data is input to the client and output to another client.

A third arbitration scheme arbitrates amongst the clients based on a priority signal provided by each client indicating when a client is about to run out of data needed to generate outputs. Unfortunately, for optimal system performance, it is not necessarily the case that a client that is running out of data should be given higher priority than a client that is not about to run out of data. If the client that is running out of data is up-stream from a unit which is also stalled, then providing data to the client would not allow the system to make any additional progress.

A fourth arbitration scheme arbitrates amongst the clients based on a deadline associated with each request. The deadline is determined by the client as an estimate of when the client will need the data to provide an output to another client. Determining the deadline may be complicated, including factors such as the rate at which requests are accepted, the rate at which data from the frame buffer is provided to the client, the rate at which output data is accepted from the client by another client, and the like. The fourth arbitration scheme is complex and may not be practical to implement within a graphics processor.

Accordingly, it is desirable to have a graphics processor that arbitrates between various clients to improve the combined performance of the clients and is practical to implement within the graphics processor.

SUMMARY

The current invention involves new systems and methods for fairly arbitrating between clients with varying workloads. The clients are configured in a pipeline for processing graphics data. An arbitration unit determines a servicing priority for each client to access a shared resource such as a frame buffer. Each client provides a signal to the arbitration unit for each clock cycle. The signal indicates whether or not two conditions exist simultaneously. The first condition exists when the client is not blocked from outputting processed data to a downstream client. The second condition exists when the client is waiting for a response from the arbitration unit. The signals from each client are integrated over several clock cycles to determine a servicing priority for each client to arbitrate between the clients. Arbitrating based on the servicing priorities improves performance of the pipeline by ensuring that each client is allocated access to the shared resource based on the aggregate processing load distribution.

Various embodiments of a method of the invention for arbitrating between multiple request streams include, receiving an urgency for each of the request streams, integrating the urgency for each of the request streams to produce a servicing priority for each of the request streams, and arbitrating based on the servicing priority for each of the request streams to select one of the multiple request streams for servicing.

Various embodiments of a method of the invention for determining a servicing priority for a request stream include, determining whether a first sub-unit producing the request stream is waiting to receive requested data from a memory resource, determining whether a second sub-unit is able to receive processed data from the first sub-unit, asserting a signal when the first sub-unit is waiting to receive requested data from the memory resource and the second sub-unit is able to receive processed data from the first sub-unit, and determining the servicing priority for the request stream based on the signal.

Various embodiments of the invention include an apparatus for allocating bandwidth to a shared resource to client units within a processing pipeline. The apparatus includes a client unit configured to determine an urgency for a request stream produced by the client unit and an integration unit configured to integrate the urgency provided for the request stream over a number of clock periods to produce a servicing priority for the request stream.

BRIEF DESCRIPTION OF THE VARIOUS VIEWS OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

DISCLOSURE OF THE INVENTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
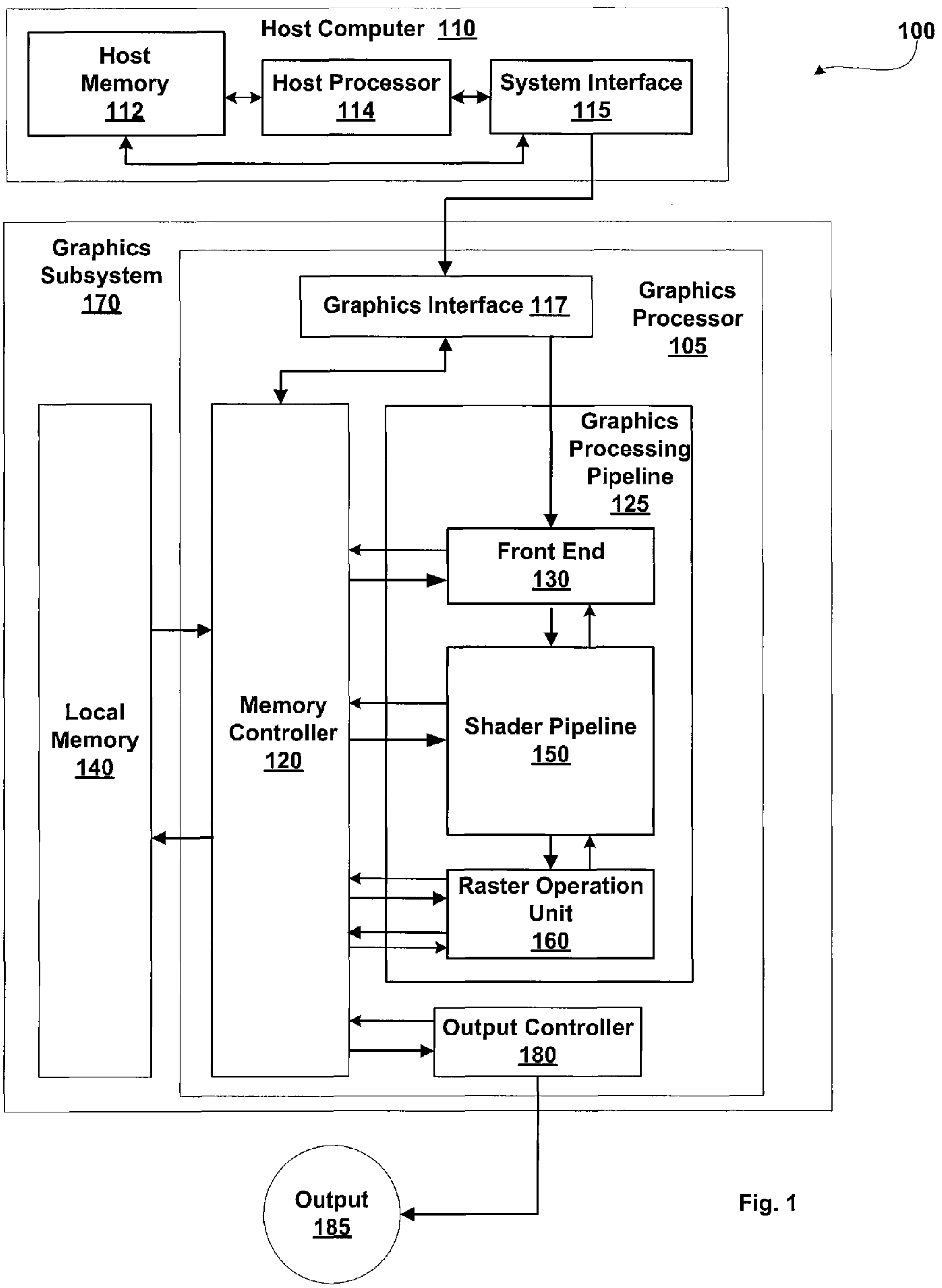
FIG. 1 is a block diagram of an exemplary embodiment of a respective computer system in accordance with one or more aspects of the present invention including a host computer and a graphics subsystem.

FIG. 1 is an illustration of a Computing System generally designated 100 and including a Host Computer 110 and a Graphics Subsystem 170. Computing System 100 may be a desktop computer, server, laptop computer, palm-sized computer, tablet computer, game console, portable wireless terminal such as a personal digital assistant (PDA) or cellular telephone, computer based simulator, or the like. Host Computer 110 includes a Host Processor 114 that may include a system memory controller to interface directly to a Host Memory 112 or may communicate with Host Memory 112 through a System Interface 115. System Interface 115 may be an I/O (input/output) interface or a bridge device including the system memory controller to interface directly to Host Memory 112. An example of System Interface 115 known in the art includes Intel® Northbridge.

Host Computer 110 communicates with Graphics Subsystem 170 via System Interface 115 and a Graphics Interface 117 within a Graphics Processor 105. Data received at Graphics Interface 117 can be passed to a Front End 130 or written to a Local Memory 140 through Memory Controller 120. Graphics Processor 105 uses graphics memory to store graphics data and program instructions, where graphics data is any data that is input to or output from components within the graphics processor. Graphics memory may include portions of Host Memory 112, Local Memory 140, register files coupled to the components within Graphics Processor 105, and the like.

A Graphics Processing Pipeline 125 within Graphics Processor 105 includes, among other components, Front End 130 that receives commands from Host Computer 110 via Graphics Interface 117. Front End 130 interprets and formats the commands and outputs the formatted commands and data to a Shader Pipeline 150. Some of the formatted commands are used by Shader Pipeline 150 to initiate processing of data by providing the location of program instructions or graphics data stored in memory. Front End 130, Shader Pipeline 150, and a Raster Operation Unit 160 each include an interface to Memory Controller 120 through which program instructions and data can be read from memory, e.g., any combination of Local Memory 140 and Host Memory 112. Memory Controller 120 arbitrates between requests from Front End 130, Shader Pipeline 150, Raster Operation Unit 160, and an Output Controller 180, as described further herein. When a portion of Host Memory 112 is used to store program instructions and data, the portion of Host Memory 112 can be uncached so as to increase performance of access by Graphics Processor 105.

Front End 130, Shader Pipeline 150, and Raster Operation Unit 160 are sub-units configured in a processing pipeline, Graphics Processing Pipeline 125. Each sub-unit provides input data, e.g., data and/or program instructions, to a downstream sub-unit. A downstream sub-unit receiving input data may block the input data from an upstream sub-unit until the downstream sub-unit is ready to process input data. Sometimes, the sub-unit will block input data while waiting to receive data that was requested from Local Memory 140. The downstream sub-unit may also block input data when the downstream sub-unit is blocked from outputting input data to another downstream sub-unit. Memory Controller 120 includes means for performing arbitration amongst the sub-units, e.g., clients, fairly arbitrating between the sub-units to improve the combined performance of the sub-units, as described further herein.

Front End 130 optionally reads processed data, e.g., data written by Raster Operation Unit 160, from memory and outputs the data, processed data and formatted commands to Shader Pipeline 150. Shader Pipeline 150 and Raster Operation Unit 160 each contain one or more programmable processing units to perform a variety of specialized functions. Some of these functions are table lookup, scalar and vector addition, multiplication, division, coordinate-system mapping, calculation of vector normals, tessellation, calculation of derivatives, interpolation, and the like. Shader Pipeline 150 and Raster Operation Unit 160 are each optionally configured such that data processing operations are performed in multiple passes through those units or in multiple passes within Shader Pipeline 150. Raster Operation Unit 160 includes a write interface to Memory Controller 120 through which data can be written to memory.

In a typical implementation Shader Pipeline 150 performs geometry computations, rasterization, and fragment computations. Therefore, Shader Pipeline 150 is programmed to operate on surface, primitive, vertex, fragment, pixel, sample or any other data. Programmable processing units within Shader Pipeline 150 may be programmed to perform specific operations, such as shading operations, using a shader program.

Shaded fragment data output by Shader Pipeline 150 are passed to a Raster Operation Unit 160, which optionally performs near and far plane clipping and raster operations, such as stencil, z test, and the like, and saves the results or the samples output by Shader Pipeline 150 in Local Memory 140. When the data received by Graphics Subsystem 170 has been completely processed by Graphics Processor 105, an Output 185 of Graphics Subsystem 170 is provided using an Output Controller 180. Output Controller 180 is optionally configured to deliver data to a display device, network, electronic control system, other computing system such as Computing System 100, other Graphics Subsystem 170, or the like. Alternatively, data is output to a film recording device or written to a peripheral device, e.g., disk drive, tape, compact disk, or the like.

Figure 2:
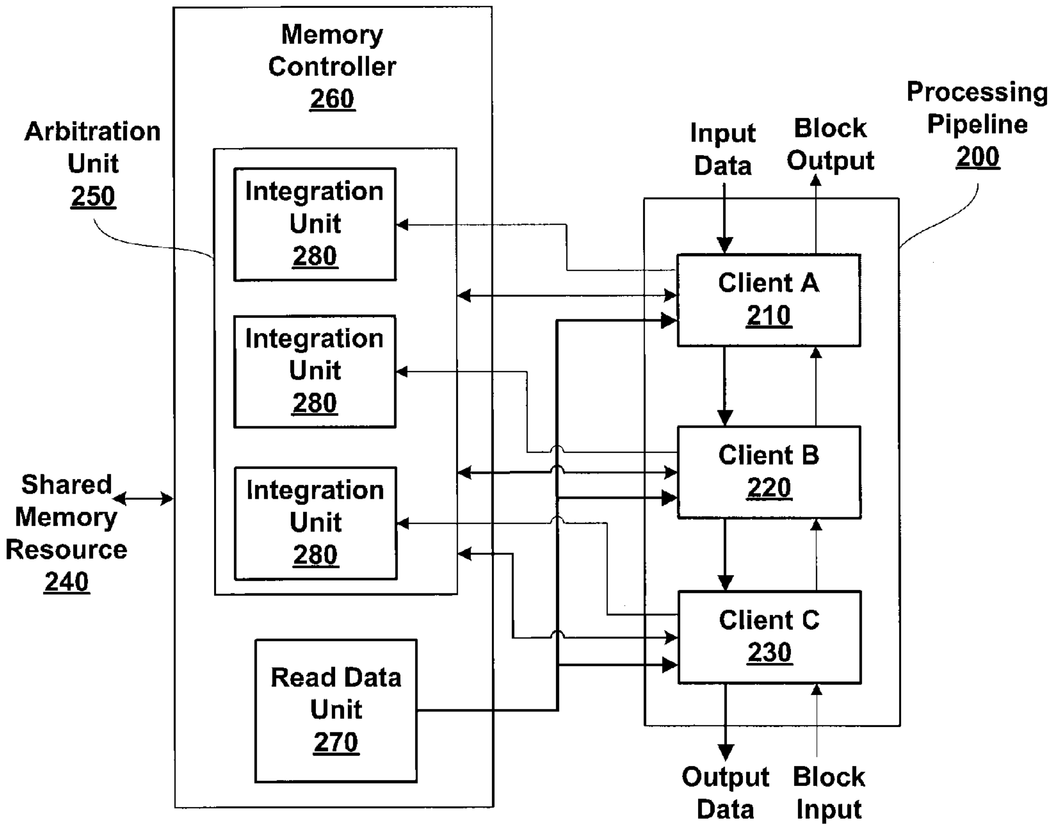
FIG. 2 is a block diagram of an exemplary embodiment of a memory controller and a processing pipeline including multiple clients in accordance with one or more aspects of the present invention.

FIG. 2 is a block diagram of an exemplary embodiment of a Memory Controller 260 and Processing Pipeline 200, in accordance with one or more aspects of the present invention. Memory Controller 120 and Graphics Processing Pipeline 125 shown in FIG. 1 are examples of Memory Controller 260 and Processing Pipeline 200, respectively.

Memory Controller 260 is coupled to a Shared Memory Resource 240, e.g., dynamic random access memory (DRAM), static random access memory (SRAM), disk drive, and the like. Memory Controller 260 includes an Arbitration Unit 250 and a Read Data Unit 270. Arbitration Unit 250 receives a request stream from each sub-unit within Processing Pipeline 200, such as a Client A 210, a Client B 220, and a Client C 230. The request streams may include read requests to read one or more locations within Shared Memory Resource 240. The request streams may include write requests to write one or more locations within Shared Memory Resource 240.

In some embodiments of the present invention, some sub-units may not generate requests, for example, those sub-units process data without accessing Shared Memory Resource 240. In some embodiments of the present invention, each request stream may include both read and write requests. In other embodiments of the present invention, each request stream may include only read requests or only write requests. In some embodiments of the present invention, Memory Controller 260 may reorder read requests and write requests while maintaining the order of writes relative to reads to avoid read after write hazards for each location within Shared Memory Resource 240. In other embodiments of the present invention, Memory Controller 260 does not reorder any requests.

Arbitration Unit 250 arbitrates between the request streams received from the sub-units within Processing Pipeline 200 to produce a single stream of requests for output to Shared Memory Resource 240. In some embodiments of the present invention, Arbitration Unit 250 outputs additional streams to other shared resources, such as Host Computer 110 shown in FIG. 1. Arbitration Unit 250 includes an Integration Unit 280 for each request stream. Each Integration Unit 280 receives a signal indicating an urgency for the request stream. The signal is used to determine a servicing priority for the request stream, as described in conjunction with FIGS. 4A and 4B. The servicing priority for each request stream is used by Arbitration Unit 250 to select a request for output in the single stream output to Shared Memory Resource 240. In some embodiments of the present invention a signal is only received for each read request stream and the read requests are arbitrated separately from the write requests, for example using a different arbitration scheme for read requests than is used for write requests.

Once a request has been accepted by Memory Controller 260, the request is pending in a dedicated queue, e.g., FIFO (first in first out memory), register, or the like, within Arbitration Unit 250, or in the output queue containing the single request stream. Once a write request has been accepted by Memory Controller 260, the sub-unit within Processing Pipeline 200 which produced the write request may proceed to make additional requests and process data. Once a read request has been accepted by Memory Controller 260, the sub-unit within Processing Pipeline 200 which produced the read request may proceed to make additional requests and process data until data requested by the read request, requested data, is needed and data processing cannot continue without the requested data.

Requested data is received by Read Data Unit 270 and output to the sub-unit within Processing Pipeline 200 which produced the read request. Each sub-unit within Processing Pipeline 200 may also receive input data from an upstream unit. The input data and requested data are processed by each sub-unit to produce processed data that is output to a downstream unit in the pipeline. The last sub-unit in Processing Pipeline 200, Client C 230 outputs output data to another unit, such as Raster Operation Unit 160 or Output 185. The output of a sub-unit is blocked by a downstream sub-unit when a block input signal is asserted, i.e., the downstream sub-unit will not accept inputs from an upstream sub-unit in Processing Pipeline 200 because the downstream sub-unit is busy processing other data. A sub-unit may continue processing data when the block input signal is asserted, eventually asserting a block output signal to the upstream sub-unit.

For example, Client B 220 may block outputs, e.g., by asserting a block input signal, from Client A 210 and Client A 210 may continue processing input data until output data is produced for output to Client B 220. At that point Client A 210 asserts a block output signal and does not accept input data. When Client B 220 negates its block output, Client A 210 begins accepting input data to generate additional output data. In some embodiments of the present invention, block input and block output are replaced with accept input and accept output and the polarity of each signal is reversed accordingly.

In a processing pipeline, such as Graphics Processing Pipeline 125, data returned for a single read request may be sufficient for many or only a few subsequent cycles of processing by a client, such as Shader Pipeline 150. For example, a shader program with many texture commands per fragment will generate significantly more texture map read requests from Shader Pipeline 150 than read requests from Raster Operation Unit 160. Similarly, a very short shader program with few texture commands per fragment generates more read requests from Raster Operation Unit 160 than texture map read requests from Shader Pipeline 150. Therefore, an arbitration unit within Memory Controller 120, such as, Arbitration Unit 250 uses the servicing priorities, determined for each request stream by an Integration Unit 280, to detect the relative degree of service that should be provided to each request stream to keep the entire Processing Pipeline 200 operating with as high of a throughput as possible given a particular processing load distribution.

Figure 3A:
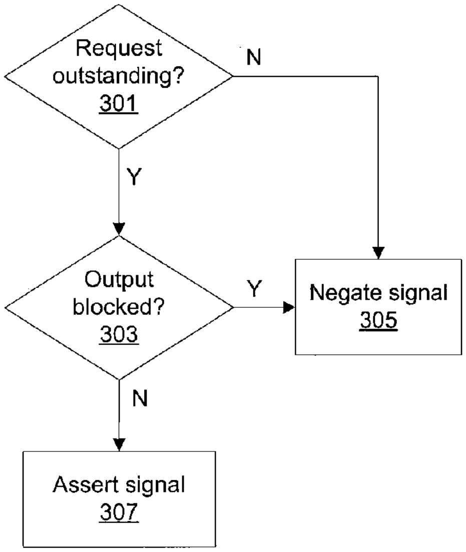
FIG. 3A is an exemplary embodiment of a method of determining a signal for output to an arbitration unit in accordance with one or more aspects of the present invention.
Figure 4A:
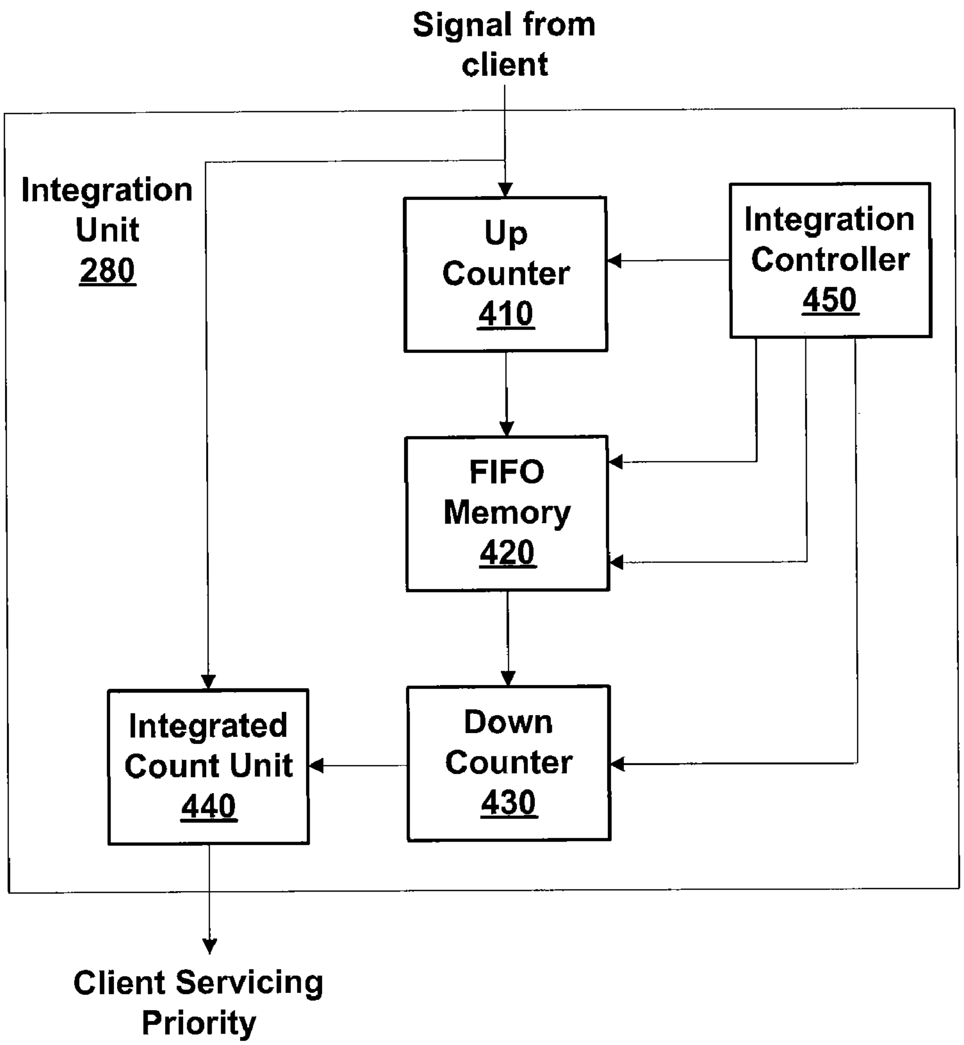
FIG. 4A is a block diagram of an exemplary embodiment of the integration unit of FIG. 2 in accordance with one or more aspects of the present invention.
Figure 4B:
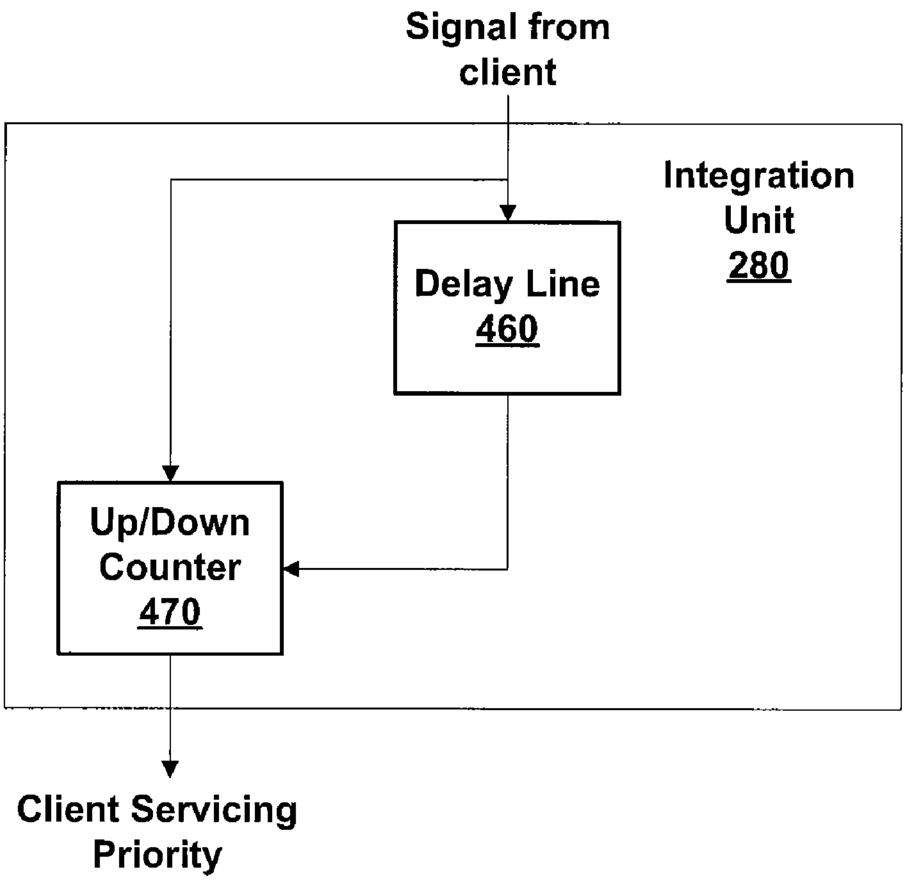
FIG. 4B is another block diagram of an exemplary embodiment of the integration unit of FIG. 2 in accordance with one or more aspects of the present invention.

The servicing priority for a request stream generated by a client, such as Client A 310, Client B 320, or Client C 330, is determined based on the signal received from the client, as described in conjunction with FIGS. 4A and 4B. FIG. 3A is an exemplary embodiment of a method of determining a signal for output to Arbitration Unit 250 in accordance with one or more aspects of the present invention. The signal is a measure of the urgency of a request stream generated by the client. The signal is updated by the client every clock cycle based on two conditions. The signal indicates whether or not two conditions exist simultaneously. The first condition exists when the client is not blocked from outputting processed data to a downstream client, i.e., block input is not asserted. The second condition exists when the client is waiting for a response from Arbitration Unit 250, i.e., requested data has not been received from Read Data Unit 270.

In some embodiments of the present invention, when the client is waiting for a response from Arbitration Unit 250 for the request stream, the client is not be able to provide processed data to the downstream client. In other embodiments of the present invention, the client may be configured to hide the latency needed to receive requested data and the client provides processed data to the downstream client for several clock cycles before receiving the requested data. Regardless of the latency hiding capabilities of the client, when the client is not waiting for requested data the signal is negated. Likewise, when the client is blocked from outputting processed data to the downstream client, the signal is negated.

In step 301*a* client determines if a request output to Arbitration Unit 250 is outstanding, i.e., if the second condition exists, and, if not, in step 305 the signal output by the client to an Integration Unit 280 within Arbitration Unit 250 is negated. If, in step 301, the client determines that the second condition does exist, then in step 303 the client determines if the output is blocked, i.e., if the first condition exists, and, if so, in step 305 the signal output by the client to the Integration Unit 280 within Arbitration Unit 250 is negated. If, in step 303, the client determines that the first condition does exist, then in step 307 the signal output by the client to the Integration Unit 280 within Arbitration Unit 250 is asserted. In an alternate embodiment of the present invention the order of steps 301 and 303 is reversed. In some embodiments of the present invention, condition 301 is further constrained to require a pending request for which the return data is required for the unit to continue processing.

Figure 3B:
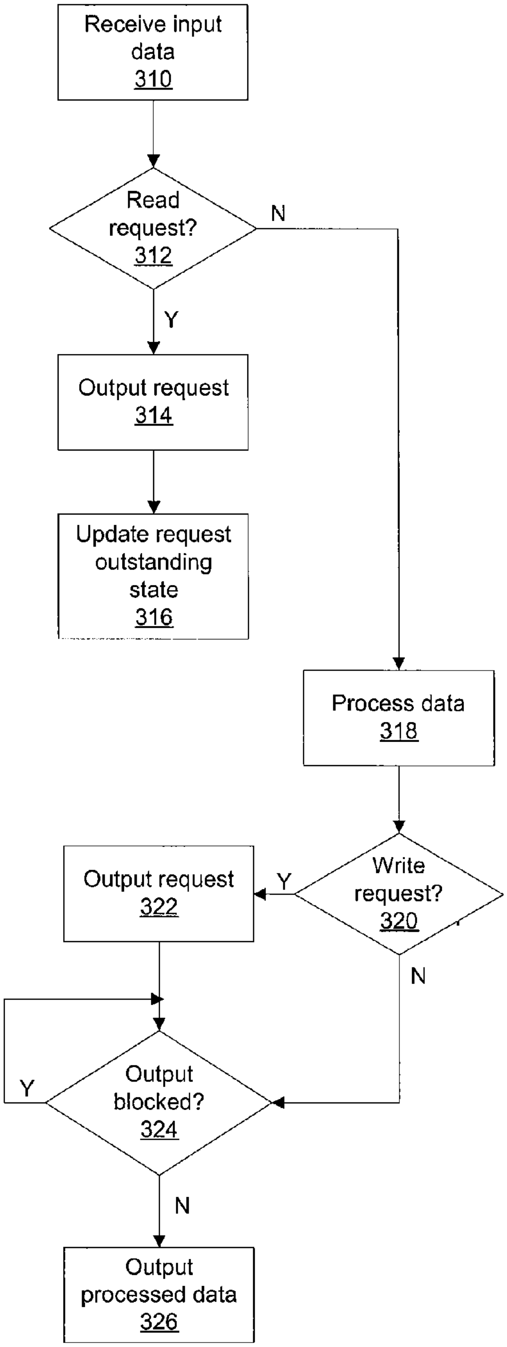
FIG. 3B is an exemplary embodiment of a method of generating a request in accordance with one or more aspects of the present invention.

FIG. 3B is an exemplary embodiment of a method of generating a request in accordance with one or more aspects of the present invention. In step 310 the client receives input data from another unit or an upstream client. Alternatively, in step 310 the client receives a command or instruction. In step 312 the client determines if a read request will be generated to process the input data, and, if so, proceeds to step 312.

If, in step 312, the client determines that a read request will be generated, then in step 314 the client generates the read request and outputs it to Memory Controller 260. In step 316 the client updates the request outstanding state to indicate that a request has been output to Memory Controller 260 for the request stream and the requested data has not been received. The request outstanding state may be a counter for each request stream output by a client. The count is incremented for each request that is output and decremented for each request for which data has been received. When the counter value is zero, there are no requests outstanding.

If, in step 312, the client determines a read request will not be generated to process the input data, then in step 318 the client processes the input data received in step 310 and the requested data to produce processed data. In step 320 the client determines if a write request will be generated to write at least a portion of the processed data to Shared Memory Resource 240, and, if so, in step 322 the client generates the write request and outputs it to Memory Controller 260. If, in step 320 the client determines that a write request will not be generated, then in step 324 the client determines if block output is asserted by a downstream client coupled to the client, and, if so, the client remains in step 324. If, in step 324, the client determines that block output is not asserted by the downstream client, then, in step 326 the client outputs the processed data to the downstream client. In some embodiments of the present invention, the client does not generate write requests and steps 320 and 322 are omitted. In some embodiments of the present invention, the client does not generate read requests and steps 312, 314, and 316 are omitted.

Figure 3C:
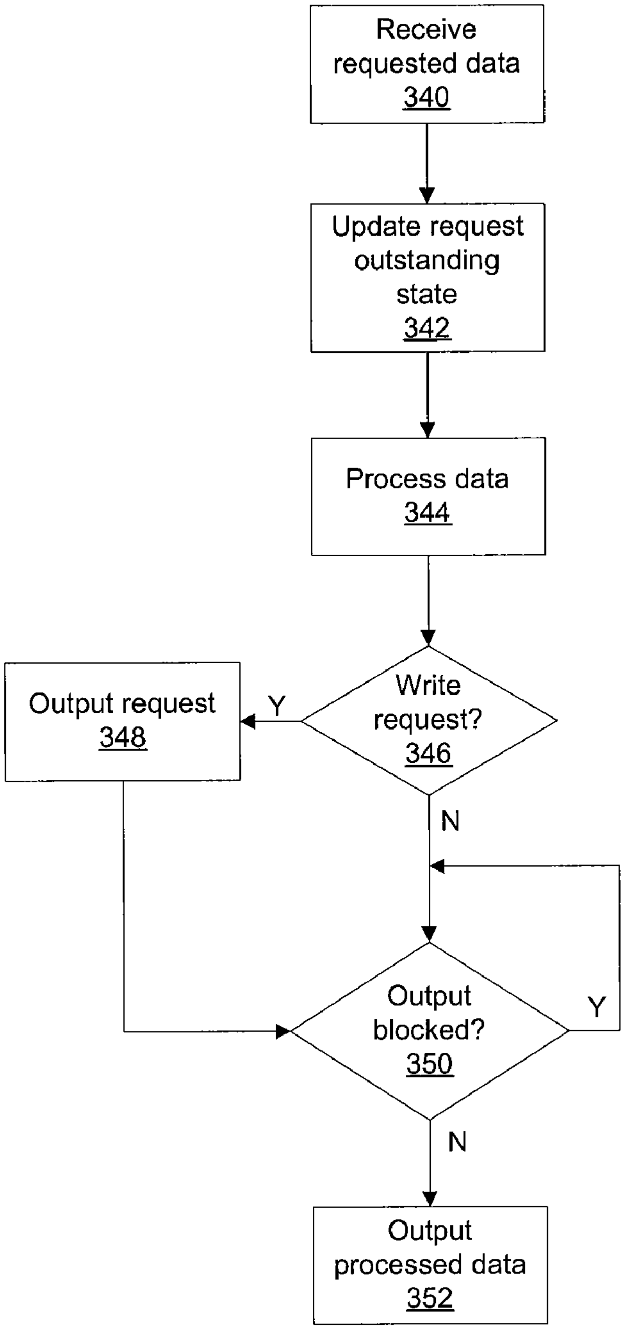
FIG. 3C is an exemplary embodiment of a method of processing requested data in accordance with one or more aspects of the present invention.

FIG. 3C is an exemplary embodiment of a method of processing requested data in accordance with one or more aspects of the present invention. In step 340 the client receives the requested data from Read Data Unit 270 within Memory Controller 260. In step 342 the client updates the request outstanding state to indicate that requested data has been received from Memory Controller 260. For example, the counter may be decremented to update the request outstanding state for the request stream. In step 344 the client processes any input data received and the requested data to produce processed data.

In step 346 the client determines if a write request will be generated to write at least a portion of the processed data to Shared Memory Resource 240, and, if so, in step 348 the client generates the write request and outputs it to Memory Controller 260. If, in step 346 the client determines that a write request will not be generated, then in step 350 the client determines if block output is asserted by a downstream client coupled to the client, and, if so, the client remains in step 350. If, in step 350, the client determines that block output is not asserted by the downstream client, then, in step 352 the client outputs the processed data to the downstream client. In some embodiments of the present invention, the client does not generate write requests and steps 346 and 348 are omitted.

Persons skilled in the art will appreciate that any system configured to perform the method steps of FIGS. 3A, 3B, 3C, or their equivalents, is within the scope of the present invention. Furthermore, persons skilled in the art will appreciate that the method steps of FIGS. 3A, 3B, 3C, may be extended to support arbitration of other types of requests, such as requests fulfilled by another sub-unit or a fixed function computation unit.

FIG. 4A is a block diagram of an exemplary embodiment of Integration Unit 280 of FIG. 2 in accordance with one or more aspects of the present invention. The signal received from a client is integrated over several clock cycles to determine which clients were not only in need of requested data, but were also preventing further processing of data as a result of not having the requested data. The integrated signal for a client is one criterion in determining the servicing priority for the request stream generated by the client. A state of the art arbiter may also use other criteria as is known by persons skilled in the art, e.g., memory access resources such as back availability, memory access penalties for initiating reads verus writes, and the like. The servicing priority is used by Arbitration Unit 250 to select a request for output to Shared Memory Resource 240, as described in conjunction with FIG. 5.

An Up Counter 410 receives the signal from the client and outputs a count. In some embodiments of the present invention Up Counter 410 is 5 bits wide. Up Counter 410 increments the count for each clock cycle when the signal is asserted. An Integration Controller 450 generates a clear signal every N clock cycles to clear Up Counter 410. N may be a fixed value, such as 32 or a programmable value. The count output by Up Counter 410 is the number of clock cycles in the last N clock cycle period for which the signal from the client was asserted. The count generated by Up Counter 410 is output to a FIFO Memory 420.

Integration Controller 450 outputs a push signal to FIFO Memory 420 to load the count into FIFO Memory 420. The push signal is asserted to capture the count prior to clearing the count. The depth of FIFO Memory 420 determines the duration of the integration period. In some embodiments of the present invention FIFO Memory 420 is 8 entries deep and 5 bits wide, effectively delaying the count by 256 clock cycles. Integration Controller 450 also outputs a pop signal to FIFO Memory 420 to output a loaded count, down count, to a Down Counter 430. Integration Controller 450 outputs a load signal to Down Counter 430 when the pop signal is output to FIFO Memory 420. Down Counter 430 loads the down count output by FIFO Memory 420. Down Counter 430 decrements the down count each clock cycle until the down count reaches a value of 0. The down count is output by Down Counter 430 to an Integrated Count Unit 440 each clock cycle.

Integrated Count Unit 440 produces the servicing priority for the client each clock cycle. Integrated Count Unit 440 increments for each clock cycle that the signal from the client is asserted. Integrated Count Unit 440 decrements for each clock cycle that the down count is greater than 0. Although the servicing priority does not decrement to match the exact timing of a delayed version of the input signal, the result is acceptable for use in arbitration. In some embodiments of the present invention, the servicing priority output by Integrated Count Unit 440 is 8 bits wide. The servicing priority for the client produced by Integrated Count Unit 440 is used by Arbitration Unit 250 to select a request for output to Shared Memory Resource 240, as described in conjunction with FIG. 5.

When request streams are generated by clients in different clock domains, the servicing priorities may be normalized by adjusting N used to compute the servicing priority for each request stream dependent on the clock frequency used by the particular client generating the request stream.

FIG. 4B is another block diagram of an exemplary embodiment of Integration Unit 280 of FIG. 2 in accordance with one or more aspects of the present invention. A Delay Line 460 receives the signal from the client and outputs a delayed version of the signal, delayed signal. Delay Line 460 may be implemented as a shift register, 1 bit wide FIFO memory, or the like. In some embodiments of the invention, Delay Line 460 delays the signal by 256 clock cycles. An Up/Down Counter 470 receives the signal from the client and the delayed signal and produces the servicing priority for the client. Up/Down Counter 470 increments the servicing priority when the signal from the client is asserted and decrements the servicing priority when the delayed signal is asserted. Depending on the number of clock cycles that the signal is integrated over, an embodiment of Integration Unit 280 may be more compact in terms of die area than another embodiment of Integration Unit 280. However, either Integration Unit 280 is practical to implement within a graphics processor to improve pipeline performance by arbitrating fairly between the clients.

Figure 5:
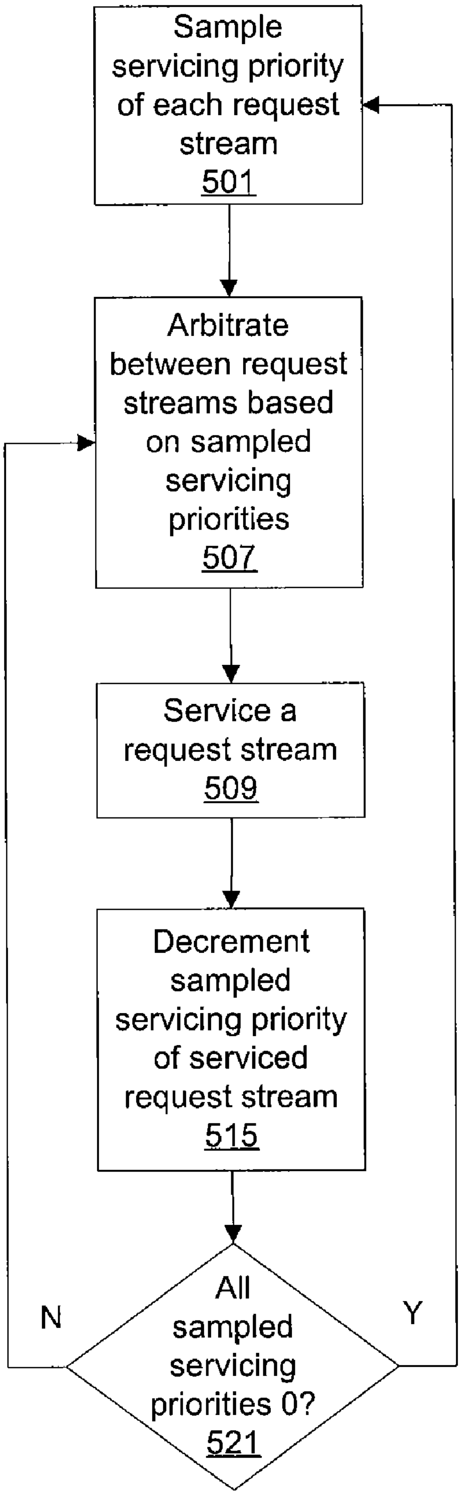
FIG. 5 illustrates an embodiment of a method of arbitrating between multiple clients in accordance with one or more aspects of the present invention.

FIG. 5 illustrates an embodiment of a method of arbitrating between multiple clients using the servicing priorities in accordance with one or more aspects of the present invention. In step 501 Arbitration Unit 250 samples the servicing priority produced by each Integration Unit 280. A sampled servicing priority is captured for each request stream. For example, each servicing priority is stored in a register with Arbitration Unit 250. In step 507 Arbitration Unit 250 arbitrates between the request streams using the sampled servicing priority to select a request for output to Shared Memory Resource Unit 240. In some embodiments of the present invention, Arbitration Unit 250 selects a request for output from the request stream with the highest sampled servicing priority. In other embodiments of the present invention other factors may be used in addition to the sampled servicing priorities to select a request for output. For example, Arbitration Unit 250 may select a request for output based on a particular access pattern that is more efficient, such as a pattern for a burst read memory access. In other embodiments of the present invention, Arbitration Unit 250 may arbitrate between the request queues based at least in part on the number of outstanding requests or the age of the requests for each request stream. In some embodiments of the present invention, Arbitration Unit 250 may also arbitrate between the request queues based in part on deadlines estimated for each request. Therefore, Arbitration Unit 250 may include staged arbiters, such as a low priority arbiter that feeds a higher priority arbiter where one or both of the arbiters use the sampled servicing priority.

In step 509 Arbitration Unit 250 outputs a request for fulfillment by Shared Memory Resource 240. In step 515 Arbitration Unit 250 decrements the sampled servicing priority for the request stream that was selected in step 507. In step 521 Arbitration Unit 250 determines if all of the sampled servicing priorities are equal to 0, and, if so, Arbitration Unit 250 returns to step 510 to sample the servicing priorities. If, in step 521 Arbitration Unit 250 determines the sampled servicing priorities are not all equal to 0, then Arbitration Unit 250 returns to step 507 and arbitrates between the different requests streams.

Persons skilled in the art will appreciate that any system configured to perform the method steps of FIG. 5, or its equivalents, is within the scope of the present invention. Furthermore, persons skilled in the art will appreciate that the method steps of FIG. 5 may be extended to support arbitration of other types of requests, such as requests fulfilled by another sub-unit or fixed function computation units. Arbitrating based on the servicing priorities improves performance of the pipeline by ensuring that each client is allocated access to the shared resource based on the aggregate processing load distribution. Therefore, overall pipeline performance may be improved compared with other arbitration schemes.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method of determining a servicing priority for a request stream, comprising:
- determining whether a first sub-unit producing the request stream is waiting to receive requested data from a memory resource;
- determining whether a second sub-unit is able to receive processed data from the first sub-unit;
- asserting a signal when the first sub-unit is waiting to receive requested data from the memory resource and the second sub-unit is able to receive processed data from the first sub-unit; and
- determining the servicing priority for the request stream based on the signal and a delayed version of the signal.

2. The method of claim 1, wherein the step of determining the servicing priority includes integrating the signal over a number clock cycles to produce the servicing priority for the request stream.

3. The method of claim 2, wherein the number of clock cycles is programmable.

4. The method of claim 2, wherein the number of clock cycles is dependent on an operating clock frequency of the first sub-unit.

5. The method of claim 1, further comprising the step of updating a request outstanding state for a request stream when a request is selected for servicing.

6. The method of claim 1, further comprising the step of updating a request outstanding state for a request stream when requested data is provided to the first sub-unit.

7. The method of claim 1, wherein the first sub-unit performs graphics processing operations.

8. The method of claim 1, wherein the second sub-unit performs graphics processing operations.

9. A graphics processor, comprising:
- a graphics interface configured to receive graphics data from a system interface of a host computer;
- a graphics processing pipeline comprising a plurality of pipeline units; and
- a memory controller configured to:
- determine whether a first of the plurality of pipeline units producing the request stream is waiting to receive requested data from a memory resource, determine whether a second of the plurality of pipeline units is able to receive processed data from the first of the plurality of pipeline units, assert a signal when the first of the plurality of pipeline units is waiting to receive requested data from the memory resource and the second of the plurality of pipeline units is able to receive processed data from the first of the plurality of pipeline units, and determine the servicing priority for the request stream based on the signal and a delayed version of the signal.

10. The graphics processor of claim 9, wherein the memory controller is further configured to integrate the signal over a number clock cycles to produce the servicing priority for the request stream.

11. The graphics processor of claim 10, wherein the number of clock cycles is programmable.

12. The graphics processor of claim 10, wherein the number of clock cycles is dependent on an operating clock frequency of the first of the plurality of pipeline units.

13. The graphics processor of claim 9, wherein the memory controller is further configured to update a request outstanding state for the request stream when a request is selected for servicing.

14. The graphics processor of claim 9, wherein the memory controller is further configured to update a request outstanding state for the request stream when requested data is provided to the first of the plurality of pipeline units.

* * * * *